United States Patent [19]
Ikegami

[11] Patent Number: 6,009,769
[45] Date of Patent: Jan. 4, 2000

[54] SHIFT LOCK UNITS FOR SHIFT LEVER DEVICES

[75] Inventor: Yasuyuki Ikegami, Shizuoka, Japan

[73] Assignee: Fuji Kiko Co., Ltd., Tokyo, Japan

[21] Appl. No.: 08/997,659

[22] Filed: Dec. 23, 1997

[30] Foreign Application Priority Data

Dec. 25, 1996 [JP] Japan ................................. 8-344705

[51] Int. Cl.⁷ ............................. F16H 63/34; F16H 59/02
[52] U.S. Cl. ................................. 74/473.23; 74/473.21; 74/473.22; 74/483 R; 192/220.4
[58] Field of Search ........................... 74/473.21, 473.23, 74/473.25, 473.22, 483 R; 192/220.3, 220.4

[56] References Cited

U.S. PATENT DOCUMENTS 5,695,029  12/1997  Yokoyama et al. ................... 192/4 A

FOREIGN PATENT DOCUMENTS

| 1-182130 | 7/1989 | Japan . |
| 7-20460 | 4/1995 | Japan . |
| 7-20463 | 4/1995 | Japan . |
| 7-119813 | 5/1995 | Japan . |

*Primary Examiner*—Allan D. Herrmann
*Attorney, Agent, or Firm*—Foley & Lardner

[57] ABSTRACT

A shift lock unit for a shift lever device includes a swing base rotatably supported in a casing and including a pair of longitudinally separated protrusions, a rotary lock member rotatably supported in the casing and including parking and neutral engagements which can abut on the protrusions, respectively, a shift lever arranged with the swing base for serving to select a desired range of a transmission, and an actuator fixed to the casing for rotating the rotary lock member when the shift lever is moved to one of the parking and neutral ranges.

11 Claims, 9 Drawing Sheets

SHIFT LOCK UNITS FOR SHIFT LEVER DEVICES

BACKGROUND OF THE INVENTION

The present invention relates to shift lock units for shift lever devices for use in automatic transmissions.

In a growing tendency of the wide use of gate-type multistage transmissions, JP-A 7-119813 proposes a shift lever device which includes a lock unit for ensuring shift lock from the parking (P) or neutral (N) range to the reverse (R) range to prevent careless shift operation of the transmission.

The reference shows, in the first embodiment, a lock unit comprising a V-shaped stopper which has P and N engagements engageable with the P and N ranges of a gate for a shift lever arranged to be swingable in the longitudinal and cross directions of a vehicular body. The stopper is rotated by a solenoid or actuator operated in accordance with brake operation or achievement of a given vehicular speed, obtaining shift lock.

The reference shows, in the second embodiment, a lock unit comprising a stopper which includes two links so that P and N engagements are movable close to and apart from each other, solving a problem of the first embodiment due to movement of the P and N engagements in the same direction.

However, with the lock unit as described in the first embodiment, continuous operation of the solenoid during vehicular cruising puts the N engagement in the N range to achieve N-range shift lock, resulting in shortened reliability with regard to breakdown, etc. of the unit. Moreover, shift lock cannot be obtained when the electric system is break down. On the other hand, with the lock unit as described in the second embodiment, the lock unit can solve the problem of the first embodiment by using the stopper including two links, which means, however, increased number of parts, resulting in lowering of the operating accuracy of the unit.

It is, therefore, an object of the present invention to provide shift lock units for shift lever devices, which secure high reliability with simple construction.

SUMMARY OF THE INVENTION

An aspect of the present invention lies in providing a shift lock unit for a shift lever device for use in an automatic transmission having parking and neutral ranges, comprising:

a casing;

a base rotatably supported in said casing, said base including first and second protrusions separated from each other in a longitudinal direction thereof;

a lock member rotatably supported in said casing, said lock member including first and second engagements which can abut on said first and second protrusions, respectively;

a shift lever arranged with said base, said shift lever serving to select a desired range of the transmission; and an actuator fixed to said casing, said actuator rotating said lock member when said shift lever is moved to one of the parking and neutral ranges.

DETAILED DESCRIPTION OF THE INVENTION

Figure 1:
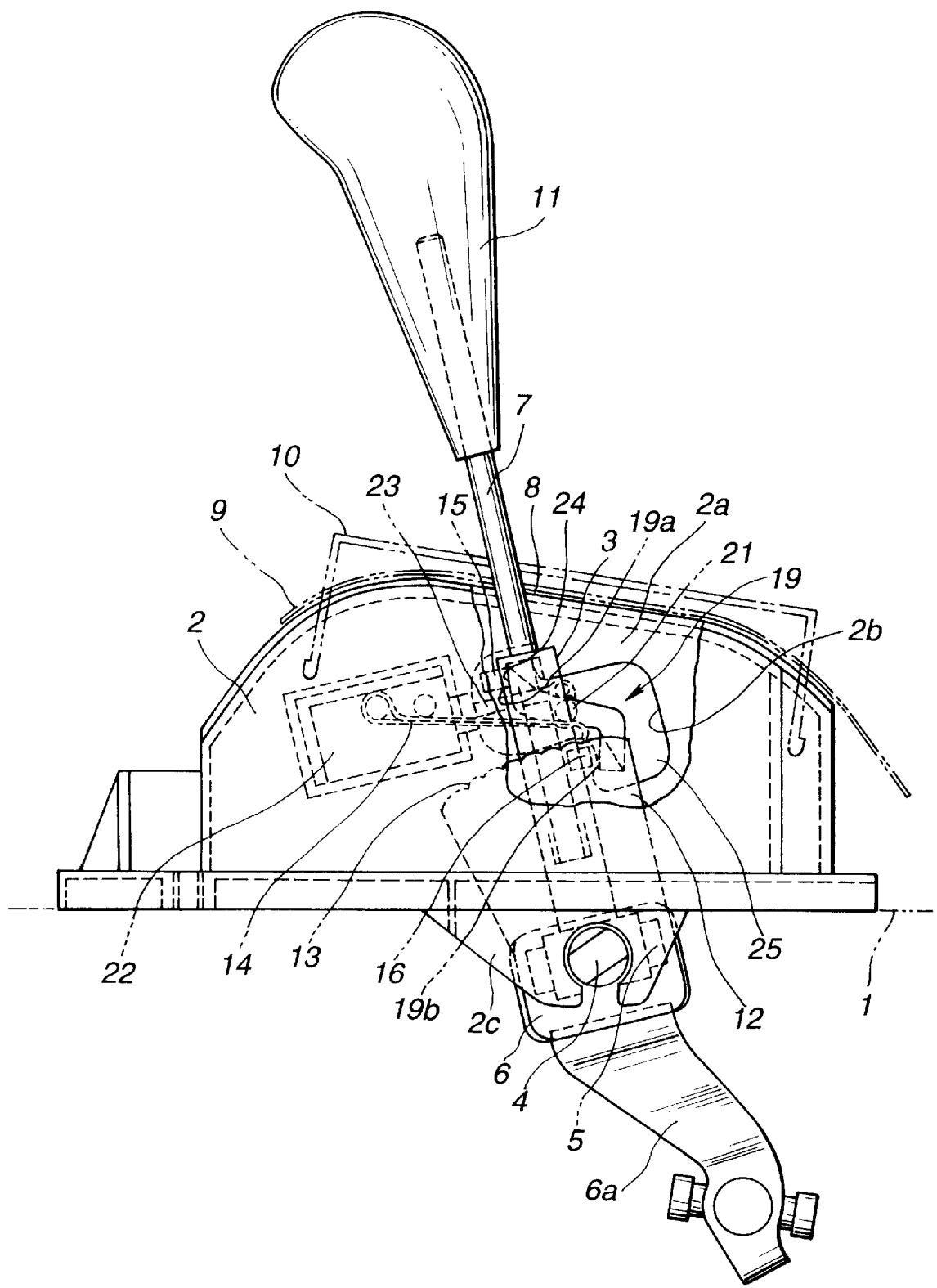
FIG. 1 is a side view, partly broken, showing a first embodiment of a shift lock unit for a shift lever device according to the present invention.
Figure 2:
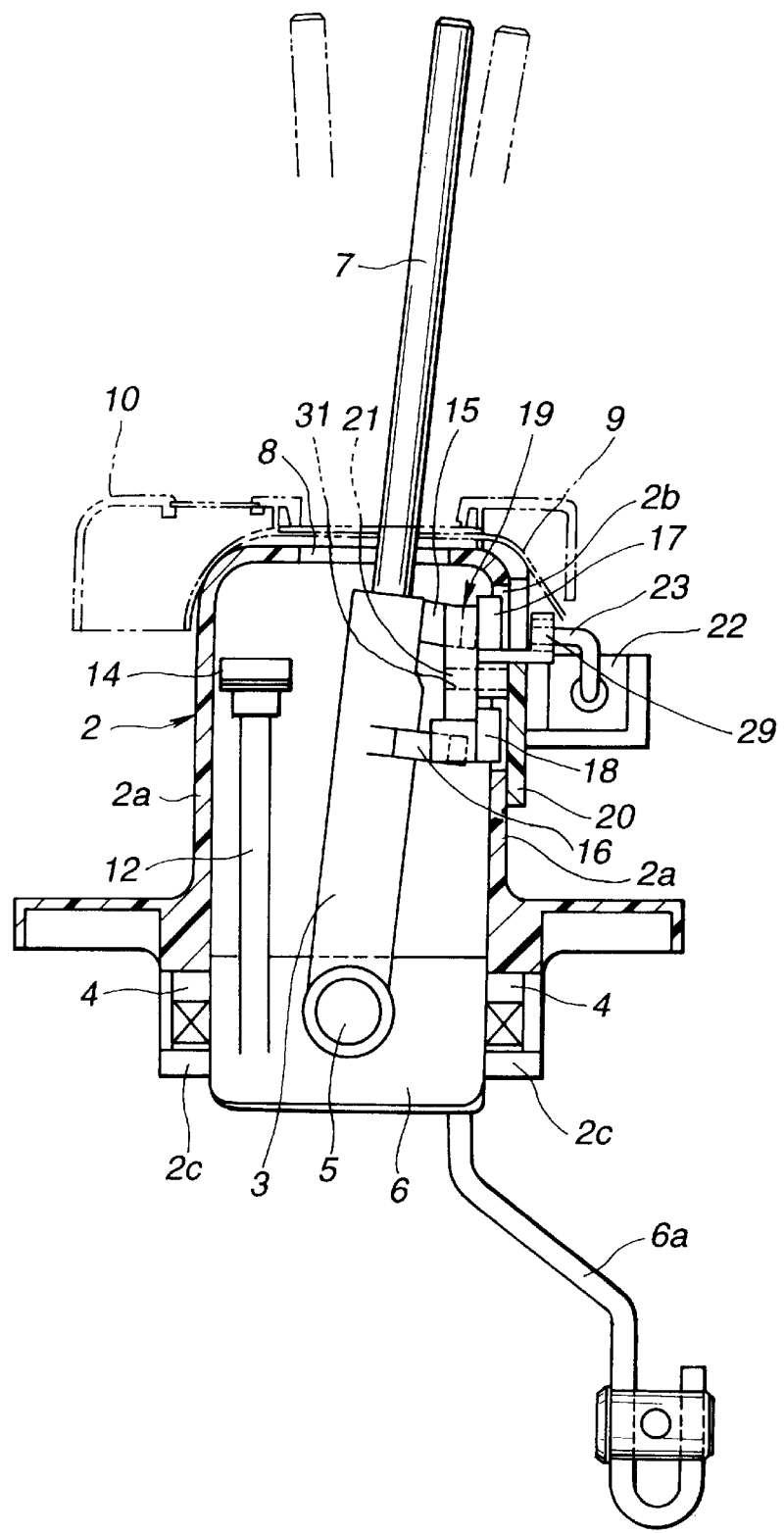
FIG. 2 is a sectional view showing the shift lock unit.

Referring to FIGS. 1–10, particularly to FIGS. 1–2, a shift lever device for an automatic transmission for a vehicle includes a casing 2 mounted to a vehicular body 1, and a swing base 3 supported to the casing 2 to be rotatable in the longitudinal and cross directions of the vehicular body 1 through shafts 4, 5, respectively. The shaft 4 is integrated with a longitudinally swingable member 6, and is supported by a bracket 2c integrated with a lower portion of the casing 2. A lever 6a is integrally connected to the swingable member 6 to extend downward of the vehicular body 1, having a lower end connected to a transmission operating rod or cable.

A shift lever 7 is axially arranged with the swing base 3, and extends through a gate 8 formed in the top of the casing 2 in the longitudinal direction of the vehicular body 1, protruding from zigzag guide holes formed in a slide plate 9 slidably disposed on the top of the casing 2 and an indicator 10 fixed to the top of the slide plate 9.

A restrictor plate 12 is integrated with the swingable member 6, and has an upper end face formed in a circular arc with its center at the shaft 4 and with a predetermined radius and formed with substantially semicircular grooves 13 as many as the shift ranges such as parking (P), reverse (R), neutral (N), drive (D), first speed (1), and second speed (2) ranges. A resilient member 14 including a plate spring has one end with substantially circular section engaged with one of the grooves 13, and another end supported by an inner side wall 2a of the casing 2.

When a driver, holding the knob 11, moves the shift lever 7 in the longitudinal and cross directions of the vehicular body 1 to obtain a desired shift range, the swing base 3 is rotated about the shafts 4, 5 to rotate the swingable member 6. Thus, the restrictor plate 12 is rotated against press engagement of the groove 13 with the resilient member 14, obtaining restrained feel of range shifting. At the same time, the lever 6a is moved to operate the transmission operating rod, shifting the transmission to the desired shift range.

Figure 3:
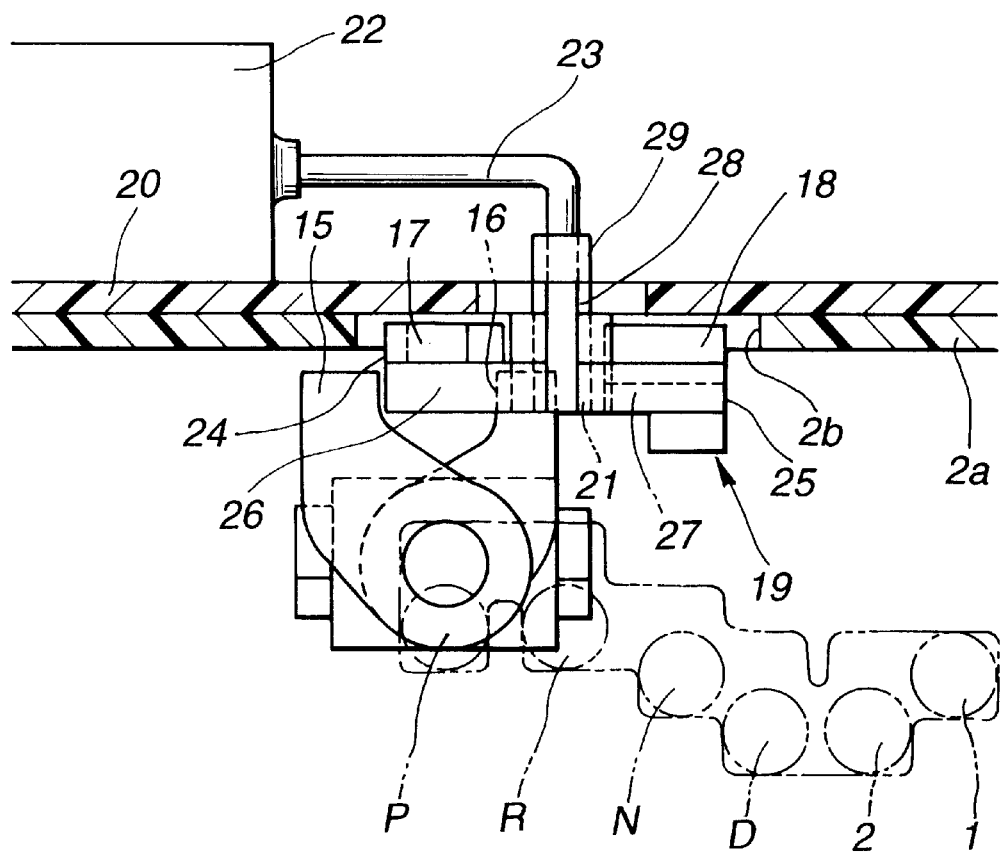
FIG. 3 is a fragmentary section of FIG. 1.
Figure 4A:
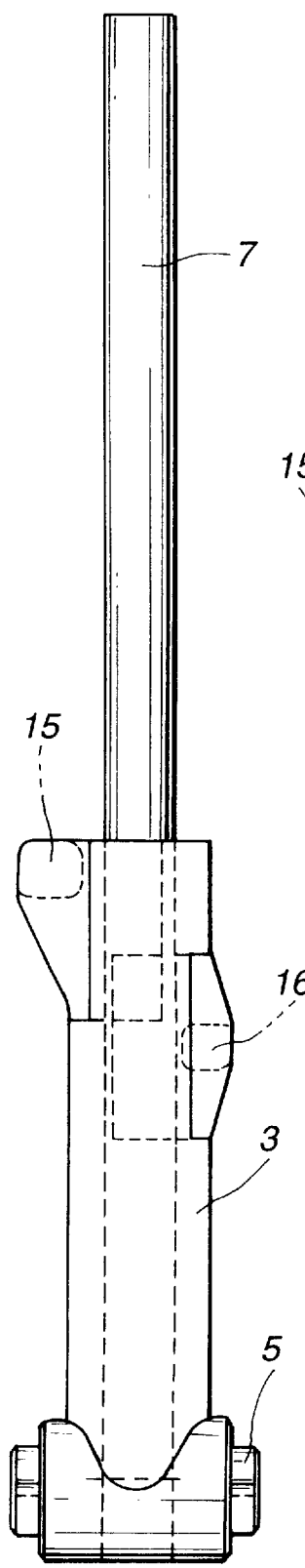
FIG. 4A is a side view showing a shift lever device arranged with a swing base.
Figure 4B:
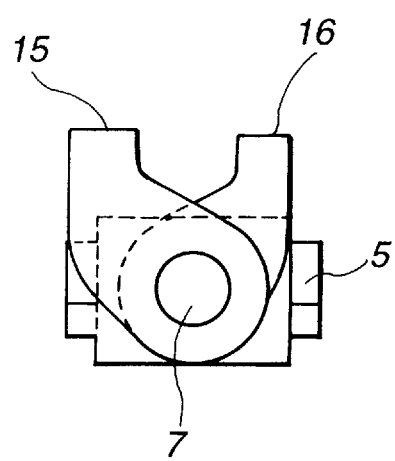
FIG. 4B is a plan view showing the shift lever device.
Figure 4C:
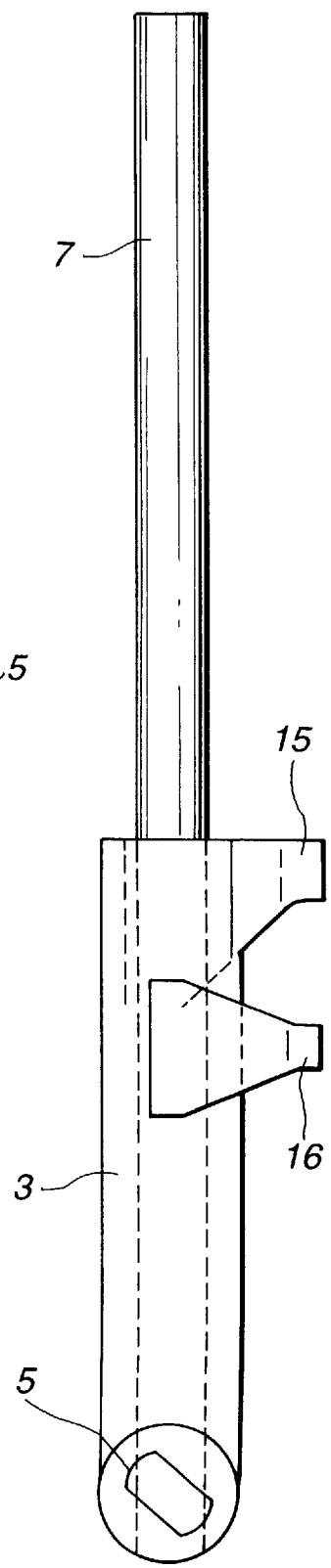
FIG. 4C is a front view showing the shift lever device.

Referring to FIGS. 2–3, in order to obtain shift lock of the shift lever 7 from the P or N range to the R range, the swing base 3 is formed with a pair of vertically or longitudinally separated protrusions 15, 16, and a rotary lock member 19 is supported on a side wall 2a of the casing 2, having P and N engagements 24, 25 at both ends to be able to abut on the protrusions 15, 16. Referring also to FIGS. 4A–4C, the protrusions 15, 16 are integrated with the swing base 3 such that the former is placed in the upper portion of the swing base 3 to be able to abut on the P engagement 24, and the latter is placed substantially in the middle of the swing base 3 to be able to abut on the N engagement 25.

A substantially Z-shaped recess 2b is formed in the side wall 2a of the casing 2 as shown in FIG. 1, and a support plate 20 is fixed to the outside thereof to close the recess 2b as shown in FIG. 3. Arranged with the support plate 20 is a shaft-like protrusion 21 by which the rotary lock member 19 is rotatably supported. As shown in FIG. 2, the shaft-like protrusion 21 is disposed between the protrusions 15, 16 to protrude from the side wall 2a of the casing 2. An actuator 22 is fixed to the support plate 20 to drive the rotary lock member 19 as occasion demands. The actuator 22 includes a plunger 23 arranged to be withdrawn therein when supplying power.

Figure 5:
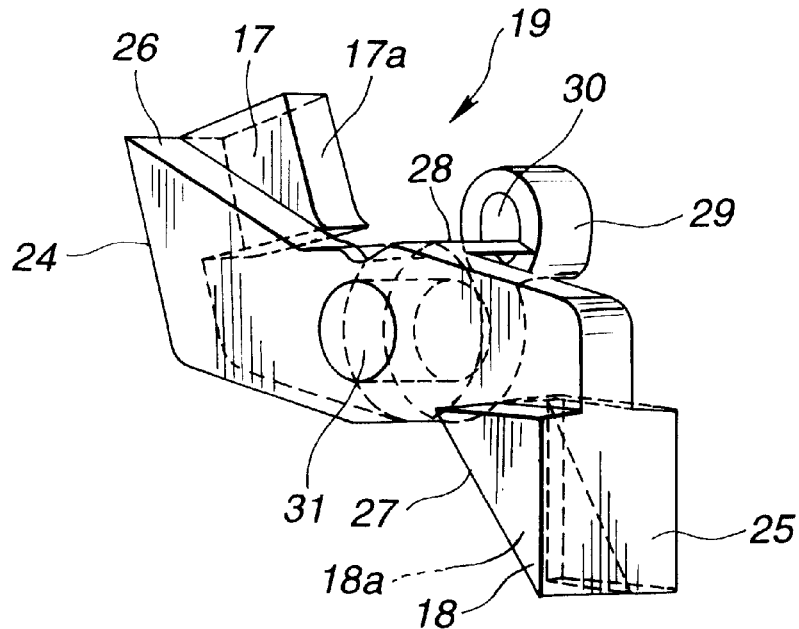
FIG. 5 is a perspective view showing a rotary lock member.
Figure 6:
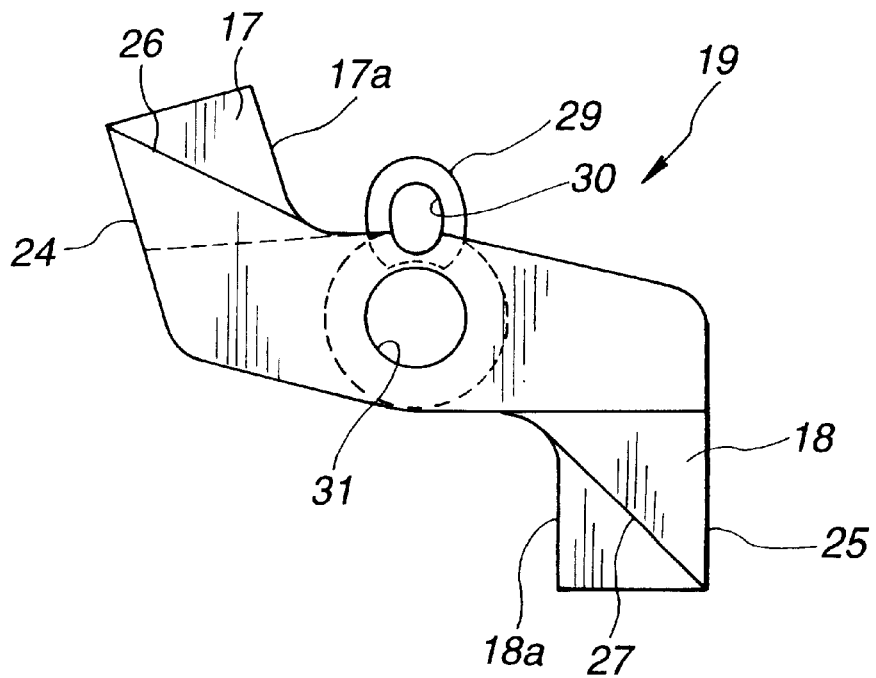
FIG. 6 is a view similar to FIG. 4C, showing the rotary lock member.
Figure 7:
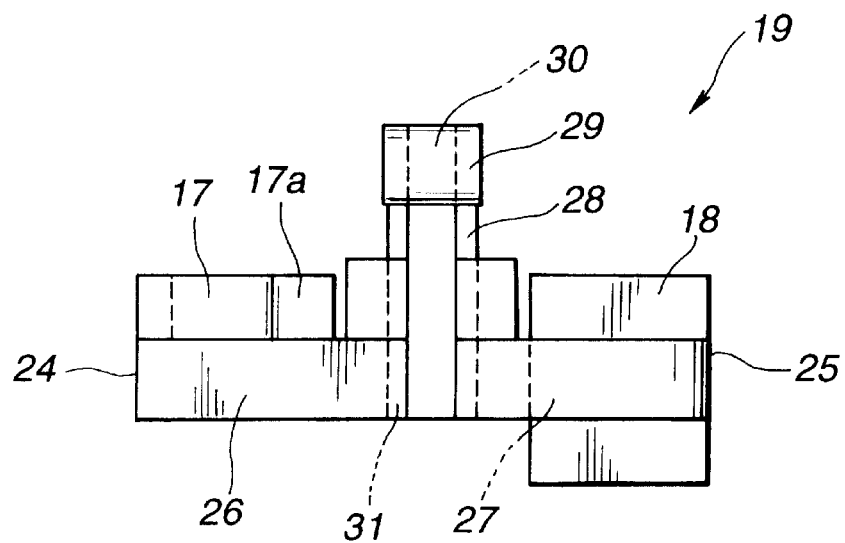
FIG. 7 is a view similar to FIG. 4B, showing the rotary lock member.
Figure 8:
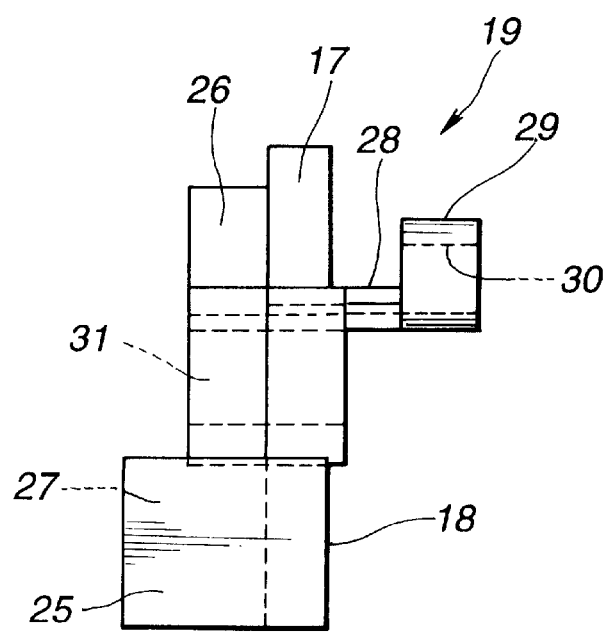
FIG. 8 is a view similar to FIG. 4A, showing the rotary lock member.

Referring to FIGS. 5–6, the rotary lock member 19 having the P and N engagements at both ends is in the form of a lever, and includes a pair of L-shaped ends 17, 18 symmetrically formed with respect to a shaft hole 31 as a center of rotation formed in the center of the rotary lock member 19. The L-shaped ends 17, 18 are formed with taper 26, 27 which become smaller toward the shaft hole 31. Moreover, the rotary lock member 19 includes above the shaft hole 31 an axial extension 28 having a cylinder 29 formed with a plunger hole 30 with substantially oval section. The plunger hole 30 is engaged with a right-angled end of the plunger 23 of the actuator 22.

Figure 9:
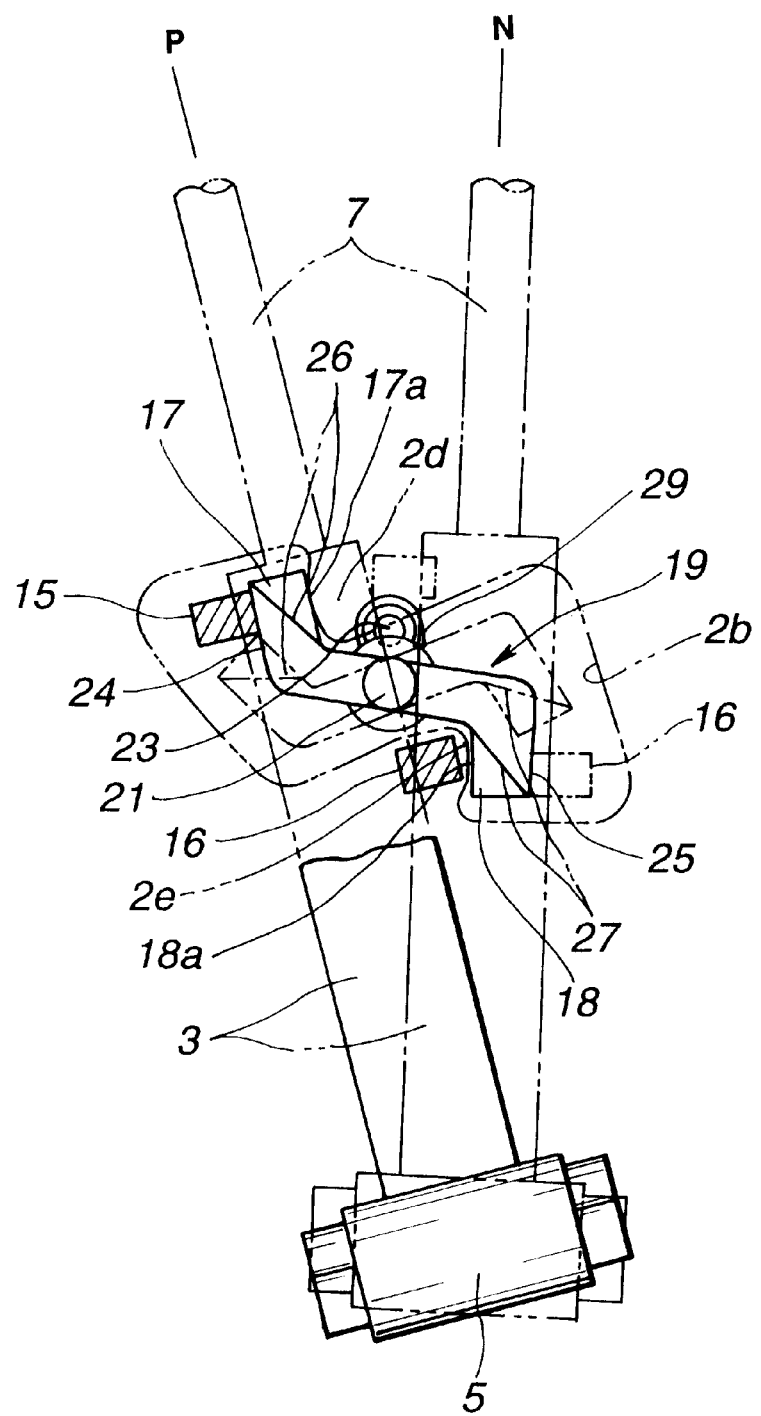
FIG. 9 is a diagrammatic view for explaining P-range shift lock.
Figure 10:
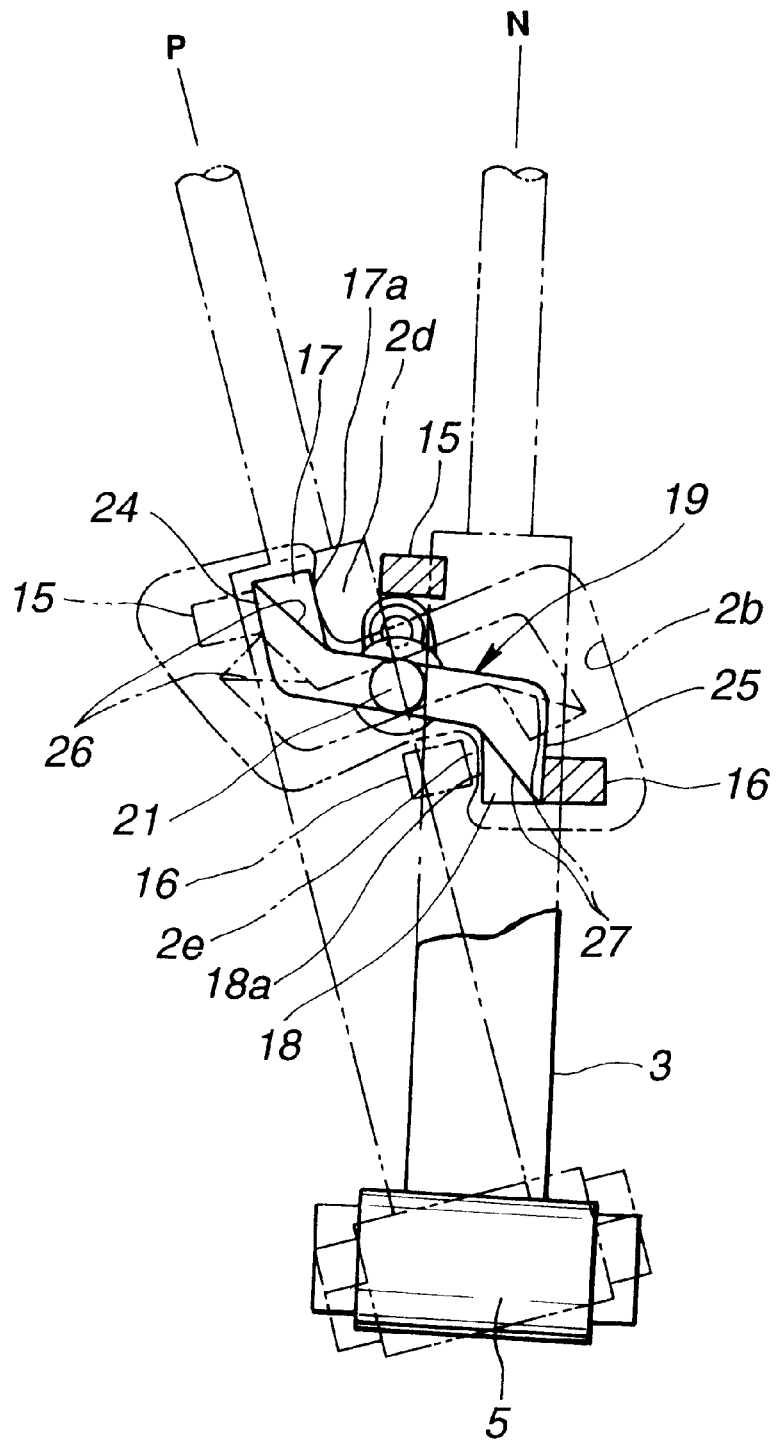
FIG. 10 is a view similar to FIG. 9, for explaining N-range shift lock.

The L-shaped ends 17, 18 have stoppers 17a, 18a formed in the rear of the P and N engagements 24, 25 to be parallel thereto. Referring to FIG. 9, when the rotary lock member 19 is in the lock position, the stoppers 17a, 18a, which are rotatable in the recess 2b of the side wall 2a, can abut on stepped end faces 2d, 2e of the recess 2b. On the other hand, when the rotary lock member 19 is in the lock released position, the tapers 26, 27 become parallel to each other, along which protrusions 15, 16 are moved.

When the shift lever 7 is moved to the P range, the fact that the swing base 3 is moved thereto is electrically detected by a switch, not shown. In this state, the actuator 22 is not supplied with power so that the plunger 23 is protruded by force of a spring arranged in the actuator 22 to rotate the rotary lock member 19. Note that at this time, the shift lever 7 is in the P range as indicate by two-dot chain line in FIG. 3, so that the protrusion 15 does not disturb rotation of the rotary lock member 19. Thus, as indicated by fully-drawn line in FIG. 9, the P engagement 24 comes to abut on the protrusion 15 of the swing base 3 to prevent backward rotation of the shift lever 7, obtaining shift lock thereof in the P range.

In this lock state, even if the driver tries to move the shift lever 7 by force, the stopper 17a of the rotary lock member 19 comes to abut on the stepped end face 2d of the recess 2b to prevent rotation of the rotary lock member 19. Thus, a load for moving the shift lever 7 is provided to the casing 2 from the protrusion 15 through the rotary lock member 19, and is not provided to the shaft-like protrusion 21 and the actuator 22.

When, with the ignition switch turned on to start the engine, the actuator 22 is supplied with power by depressing a brake pedal, the plunger 23 is withdrawn against a force of the spring as indicated by two-dot chain line in FIG. 9 to rotate the rotary lock member 19 counterclockwise. Thus, the protrusion 15 of the swing base 3 can be moved over the taper 26 of the rotary lock member 19 in the backward direction of the vehicular body 1, i.e. to the R and N ranges. Then, the shift lever 7 is moved to the D range for vehicular cruising.

When the vehicular cruising speed is greater than a given value, power to the actuator 22 is cut off, so that the plunger 23 is protruded again to return the rotary lock member 19 to the lock state. Thus as indicated by fully-drawn line in FIG. 10, the N engagement 25 of the rotary lock member 19 is rotated to and stopped in the position to be able to abut on the protrusion 16 of the swing base 3. Therefore, even if the driver tries erroneously to move the shift lever 7 to the R range, the protrusion 16 of the swing base 3 comes to abut on the N engagement 25 to prevent forward rotation of the shift lever 7, preventing shifting thereof to the R range.

In this lock state, if the driver tries to move the shift lever 7 to the R range by force, the stopper 18a of the rotary lock member 19 comes to abut on the stepped end face 2e of the recess 2b to prevent rotation of the rotary lock member 19. Thus, a load for moving the shift lever 7 is provided to the casing 2 from the protrusion 16 through the rotary lock member 19, and is not provided to the shaft-like protrusion 21 and the actuator 22.

When the vehicular cruising speed is smaller than a given value, the actuator 22 is supplied with power again, so that the plunger 23 is withdrawn again to rotate the rotary lock member 19 to the lock released position. Thus, as indicated by two-dot chain line in FIG. 10, the protrusion 16 can be moved under the taper 27, i.e. the shift lever 7 can be moved to the R or P range.

According to the first embodiment, the rotary lock member 19 is small in size, and thus needs a narrower operating space. Moreover, since a load input from the shift lever 7 through the rotary lock member 19 is provided to the side wall 2a of the casing 2, and not to the shaft-like protrusion 21 and the actuator 22, the rotary lock member 19 does not need to be formed from a high-strength material, resulting in a weight reduction and an improvement in the reliability with regard to the shift lock position.

Figure 11:
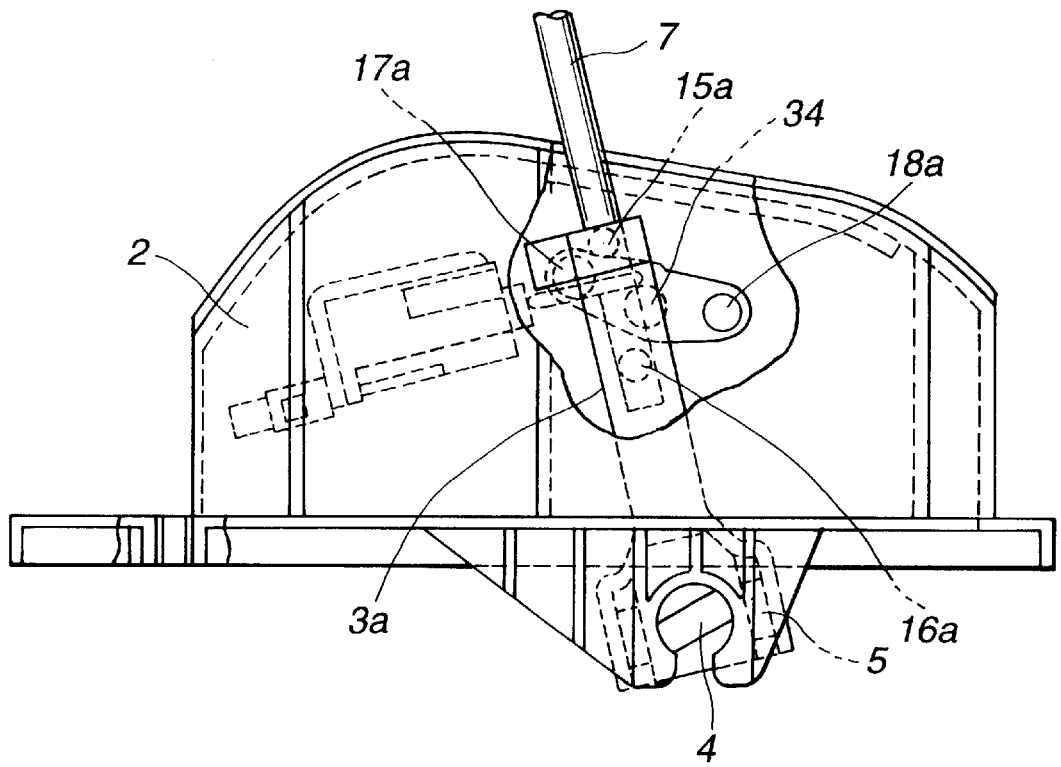
FIG. 11 is a view similar to FIG. 1, showing a second embodiment of the present invention.
Figure 12:
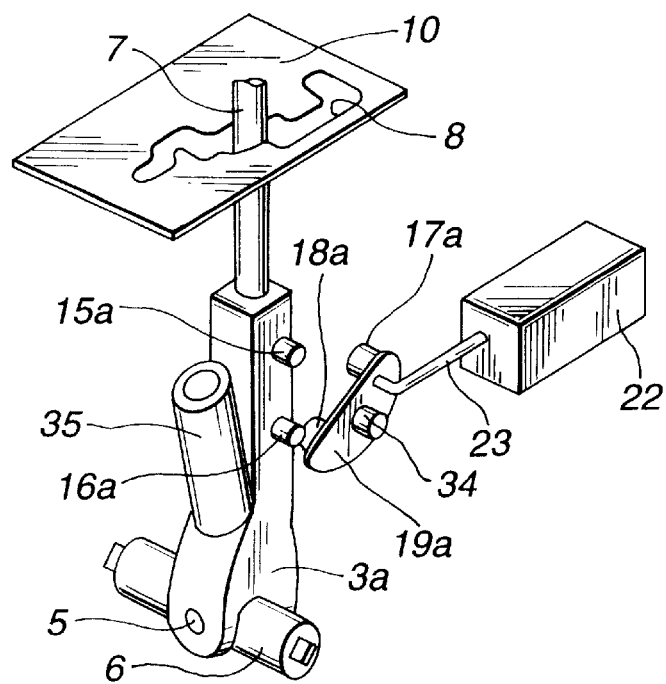
FIG. 12 is a fragmentary perspective view showing the second embodiment.

FIGS. 11–12 show a second embodiment of the present invention which is substantially the same as the first embodiment. In the second embodiment, a rotary lock member 19a is in the form of a plate, having one side with which cylindrical P and N engagements 17a, 18a are integrated at both ends, and another side with which a shaft 34 is integrated. A swing base 3a is formed with a pair of vertically or longitudinally separated cylindrical protrusions 15a, 16a. The shaft 34 is rotatably supported in a shaft hole of the side wall 2a of the casing 2. The right-angled end of the plunger 23 of the actuator 22, which enters the inside of the casing 2 through a long hole of the side wall 2a of the casing 2, is engaged with a through hole of the rotary lock member 19a arranged on the side of the P engagement 17a.

The restrictor plate 12 in the first embodiment is replaced with a hollow cylinder 35 integrated with the swing base 3a. The hollow cylinder 36 has therein a coil spring and a ball which is protruded by a resilient force thereof. A plate with corrugated section is arranged in the casing 2, on which the ball abuts.

The second embodiment produces a similar effect to the first embodiment. Shifting of the shift lever 7 to the R range is prevented by restricting its movement in the cross direction of the vehicular body 1 in the P and N ranges. A load for moving the shift lever 7 is provided to the side wall 2a of the casing 2 from the protrusions 15a, 16a through the rotary lock member 19a, and is not provided to the shaft 34 and the actuator 22. The rotary lock member 19a and the swing base 3a in the second embodiment are far simpler in structure than those in the first embodiment, resulting in a further reduction in size and manufacturing cost.

According to the present invention, P-range and N-range shift locks are always carried out when power to the actuator 22 is cut out, resulting in a reduction not only in work of the actuator 22, but in size thereof due to small size and light weight of the rotary lock member 19, 19a.

Having described the present invention in connection with the preferred embodiments, it is noted that the present invention is not limited thereto, and various changes and modifications can be made without departing from the scope of the present invention.

What is claimed is:

1. A shift lock unit for a shift lever device for use in an automatic transmission having parking and neutral ranges, comprising:

a casing;

a base rotatably supported in said casing, said base including first and second protrusions separated from each other in a longitudinal direction thereof;

a lock member rotatably supported in said casing, said lock member including first and second engagements which can abut on said first and second protrusions, respectively;

a shift lever arranged with said base, said shift lever serving to select a desired range of the transmission; and an actuator fixed to said casing, said actuator rotating said lock member when said shift lever is moved to one of the parking and neutral ranges.

2. A shift lock unit as claimed in claim 1, wherein when said lock member is in a lock position, said first and second protrusions of said base come to abut on said first and second engagements of said lock member to prevent shifting of said shift lever from the parking and neutral ranges, respectively.

3. A shift lock unit as claimed in claim 1, wherein when said lock member is in a lock release position, said first and second protrusions of said base can be moved over and under said lock member, respectively.

4. A shift lock unit as claimed in claim 3, wherein said lock member includes a lever.

5. A shift lock unit as claimed in claim 4, wherein said lock member has in a center a hole engaged with a protrusion arranged between said first and second protrusions of said base.

6. A shift lock unit as claimed in claim 5, wherein said lock member has L-shaped ends symmetrically formed with respect to said hole, said L-shaped ends being formed with said first and second engagements.

7. A shift lock unit as claimed in claim 6, wherein said L-shaped ends of said lock member have stopper portions formed in a rear of said first and second engagements, respectively.

8. A shift lock unit as claimed in claim 7, wherein said L-shaped ends of said lock member have taper portions which become smaller toward said hole, respectively.

9. A shift lock unit as claimed in claim 7, wherein said lock member is in a lock position, said stopper portions of said L-shaped ends of said lock member can abut on stepped end faces of a recess of said casing.

10. A shift lock unit as claimed in claim 3, wherein said lock member includes a plate.

11. A shift lock unit as claimed in claim 10, wherein said lock member has one side having both ends formed with said first and second engagements, and another side formed with a shaft which is engaged with a hole of said casing.

\* \* \* \* \*